ced

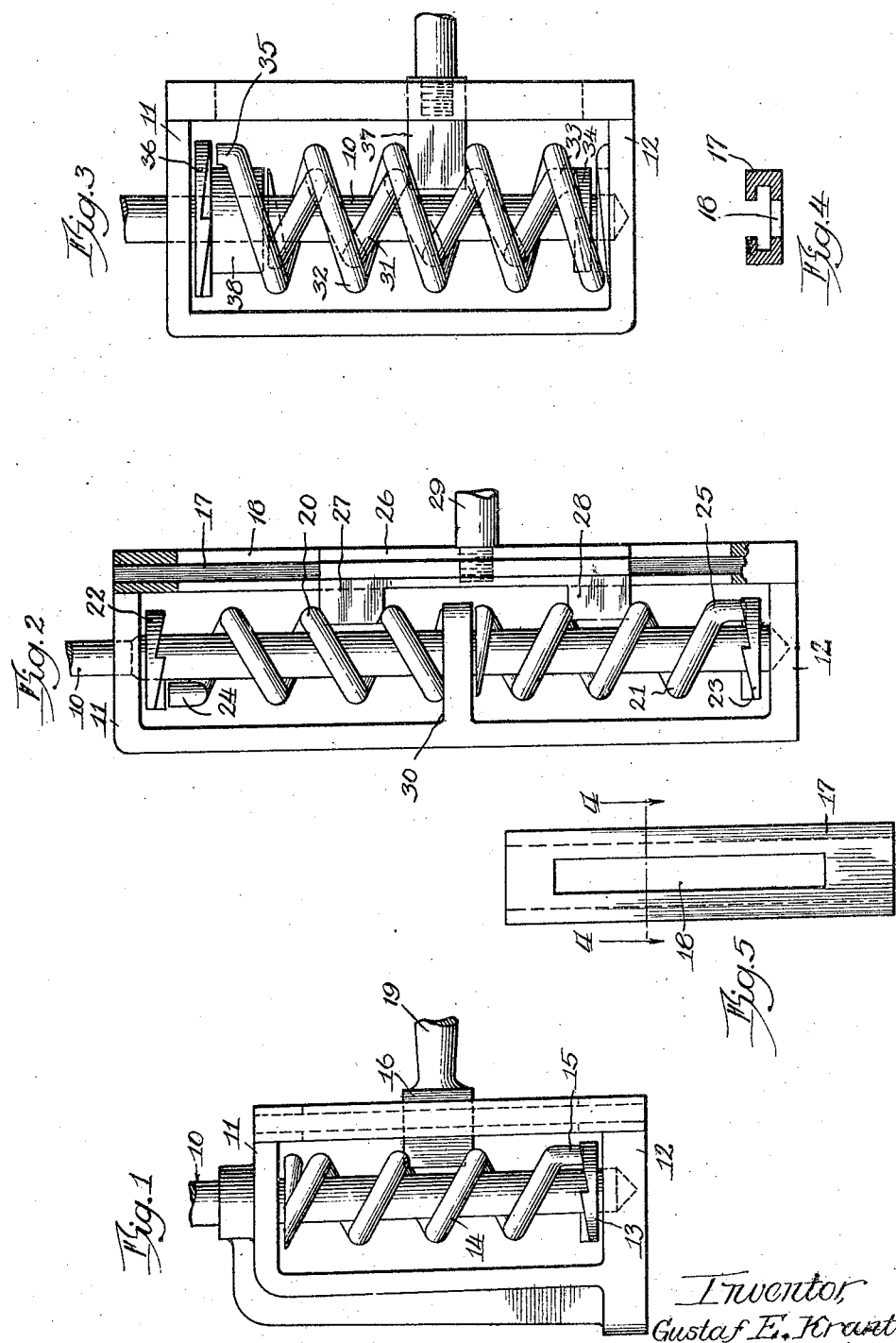

UNITED STATES PATENT OFFICE.

GUSTAF E. KRANTZ AND CARL A. KRANTZ, OF CHICAGO, ILLINOIS.

MECHANICAL MOVEMENT.

1,413,036.                Specification of Letters Patent.        Patented Apr. 18, 1922.

Application filed January 18, 1922. Serial No. 530,113.

*To all whom it may concern:*

Be it known that we, GUSTAF E. KRANTZ, a subject of the King of Sweden, and CARL A. KRANTZ, a citizen of the United States, both residing at Chicago, in the county of Cook and State of Illinois, have invented certain new and useful Improvements in Mechanical Movements, of which the following is a specification.

This invention relates to improvements in mechanical movements and one of the objects of the invention is to provide improved means whereby rectilinear motion will be converted into rotary motion.

Heretofore in movements of this character the driven shaft has been provided with a worm sleeved thereupon, the worm having a toothed driving clutch portion adapted to co-operate with a toothed clutch member connected with the shaft to rotate therewith, the worm being driven by the toothed member or worm wheel having a constant direction of rotation and being mounted upon the shaft so as to be moved bodily with respect thereto to cause the clutch members to be brought into co-operative relation to rotate the shaft. When the operating toothed member is arrested in its movement the shaft will continue to rotate and the worm will be shifted along the shaft as the worm and toothed member or worm wheel will act as a screw and nut and the worm will be positively shifted on the shaft to cause the clutch faces or elements to disengage without interfering with the rotation of the shaft.

Such mechanism, however, necessitates considerable space to permit freedom of operation of the driving element or member with the result that in instances where the space is small such movement cannot be employed.

To overcome these difficulties and objections and to provide an improved, simple, durable, cheap and compact mechanical movement of this character whereby a shaft or rotary element may be given motion by the movements of a reciprocating element through the medium of an intermediate spiral or worm loosely mounted upon the shaft for rotation therewith and for rotation and bodily shifting movement with respect thereto through the medium of the reciprocating element, is one of the objects of the present invention.

A further object is to provide improved means whereby each direction of movement of the reciprocating driving element will be alternately employed or utilized for imparting a constant direction of rotation to the shaft or rotating driven element.

To the attainment of these ends and the accomplishment of other new and useful objects as will appear, the invention consists in the features of novelty in substantially the construction, combination and arrangement of the several parts hereinafter more fully described and claimed and shown in the accompanying drawing illustrating this invention and in which Figure 1 is a view in elevation of a movement of this character.

Figure 2 is a view similar to Figure 1 of another form of the invention.

Figure 3 is a similar view of still another form of the invention.

Figure 4 is a detail sectional view taken on line 4—4, Figure 5.

Figure 5 is a view of the bottom of Figure 4.

Referring more particularly to the drawing the numeral 10 designates a driven shaft which is mounted in suitable bearings 11—12, the shaft having connected therewith a clutch element 13, which rotates with the shaft.

Loosely mounted upon the shaft intermediate the bearings is a spiral element 14, which is constructed of a piece of wire like material bent into shape to form spaced convolutions, the length of the element being slightly less than the length of the shaft intermediate the clutch element 13 and the bearing 11, so that the spiral element may be shifted longitudinally of the shaft toward and away from the clutch element 13.

One end of the spiral element is shaped to form a clutch element or tooth 15 which is adapted to co-operate with the clutch element 13, and through the medium of these clutch elements 13—15 the spiral 14 will be locked to the shaft 10 for rotation therewith but when the spiral is shifted longitudinally of the shaft so as to render the clutch elements inactive with respect to each other, the tooth 15 will be positioned so that it will not co-operate with the clutch element 13, and the shaft 10 will then be free to rotate independently with respect to the spiral.

A reciprocating element 16 is provided which engages with the convolutions or coils of the spiral 14 and this reciprocating element may be mounted in any desirable or suitable manner preferably in a guide 17, and which guide is provided with an elongated slot or opening 18, through which slot a handle 19 projects and which handle is connected with the reciprocating element 16.

With this construction the element 16 is adapted to be freely reciprocated in the guide 17 through the medium of the handle 19, and as the element 17 is moved in a direction towards the clutch element 10 the spiral 14 will be shifted longitudinally on the shaft until the tooth 15 carried thereby is brought into a position where it will be active with respect to the clutch element 13. During this movement of the element 16 it engages the convolutions of the spiral in such a manner as to impart a rotary movement to the spiral and this rotary movement of the spiral through the tooth 15 and the clutch element 13 will rotate the shaft 10.

The element 16 may be arrested at any point in its movement and when arrested the element 16 and the spiral 14 will act respectively as a screw and nut and the spiral will be positively moved in the opposite direction lengthwise of the shaft so as to move the tooth 15 away from the clutch element 13 to cause the elements to become inactive, at the same time the shaft 10 will continue to rotate. This operation may be repeated by reciprocating the element 16 and each time the element 16 is moved in a direction towards the clutch element 13 the shaft 10 will be driven by the spiral but each time the movement of the reciprocating element is arrested or reversed the spiral 14 will not drive the shaft 10.

In the form of the invention shown in Figure 2, two spirals 20—21 are loosely mounted upon the shaft 10 and are arranged end to end. The shaft 10 is provided with clutch elements 22—23 similar to the clutch element 13, but arranged at opposite ends of the shaft to rotate therewith. The spiral 20 is provided with a tooth or portion 24 adapted to co-operate with the clutch element 22 while one end of the spiral 21 is shaped to form a tooth element 25 adapted to co-operate with the clutch element 23.

In this form of the invention the reciprocating element 26 is provided with a portion 27 engaging with the convolutions of the spiral 20 and a portion 28 engaging with the convolutions of the spiral 21, the element 26 reciprocating in the guide 17 and is provided with a handle 29, by means of which the element may be reciprocated.

If desired and if the shaft 10 is of a considerable length an intermediate bearing 30 may be provided for the shaft 10. If this bearing 30 is employed it is located intermediate the proximate ends of the spirals 20 and 21.

The operation of this form of the invention is the same as that described in connection with Figure 1 with the exception that the portions 27 and 28 of the reciprocating element 26 operate to cause the spirals 20—21 to alternately become locked and unlocked to the shaft 10, so that when one of the spirals is locked to the shaft and is driving the shaft through the medium of the element 26 being moved in one direction the other spiral will be unlocked from the shaft. With this form of the invention the energy of the reciprocating element during its movement in each direction will be utilized for imparting a driving motion to one of the spirals, both of the spirals operating to impart a constant direction of rotation to the shaft 10.

In the form of the invention shown in Figure 3, two spirals 31 and 32 are mounted loosely upon the shaft 10, the spiral 31 being arranged within the spiral 32. The end 33 of the spiral 31 is shaped to form a tooth adapted to co-operate with the clutch element 34 carried by the shaft 10 and the end 35 of the spiral 32 is shaped to form a tooth adapted to co-operate with the clutch element 36, also carried by the shaft 10. The reciprocating element 37 in this form of the invention is of a construction similar to the reciprocating element 16 and is adapted to engage the convolutions of both of the spirals 31—32. The teeth or portions 33 and 35 of the respective spirals 31 and 32 are arranged at opposite ends of the spirals so that the movement of the reciprocating element in one direction will lock one of the spirals with the shaft 10 for driving the shaft and the movement of the element 37 in the opposite direction will release the locked spiral and lock the other spiral to the shaft 10 for driving the shaft, thus utilizing each direction of movement of the reciprocating element 37 for driving the shaft 10 in a constant direction of rotation.

If desired and in order to position the spiral 32 the shaft 10 or clutch element 36 may be provided with an enlarged portion 38, about which one end of the spiral 32 is coiled.

It will be manifest that with this improved invention the reciprocating element will insure that any tendency of the spiral when disengaged from the clutch member carried by the shaft, or unlocked from the shaft, to move back upon the shaft and into engagement with the clutch element carried by the shaft when the spiral is not being driven, will be overcome.

While the preferred forms of the invention have been herein shown and described it is to be understood that various changes may be made in the details of construction and in the combination and arrangement of the several parts, within the scope of the claims, without departing from the spirit of this invention.

What is claimed as new is:—

1. A shaft, a spiral mounted loosely upon the shaft, said spiral being formed of a piece of wire like material, a reciprocating driving element engaging with the spiral to drive the shaft, a clutch on the shaft, one end of the spiral being shaped to form a tooth adapted to co-operate with the clutch on the shaft, said tooth and clutch element adapted to be rendered active during movement of the driving element in one direction and to be rendered inactive during movement of the driving element in the opposite direction.

2. A shaft, a plurality of separate spirals mounted loosely upon the shaft, one of the spirals encompassing the other, a reciprocating driving element engaging with both of the spirals to drive the shaft, co-operating means between each of the spirals and the shaft, the co-operating means between one of the spirals and the shaft being adapted to be rendered active when the reciprocating member is moved in one direction and the co-operating means between the shaft and the other spiral being adapted to be rendered active when the said reciprocating element is moved in the opposite direction, each of the said co-operating means being rendered inactive when the other is active, the said shaft having a constant direction of rotation.

3. A shaft, a plurality of separate spirals mounted loosely upon the shaft and adapted for movements lengthwise of the shaft, one of said spirals encompassing the other, a reciprocating driving element engaging with both of the spirals to drive the shaft, co-operating means between each of the spirals and the shaft, the co-operating means between one of the spirals and the shaft being adapted to be rendered active when the reciprocating member is moved in one direction and the co-operating means between the shaft and the other spiral being adapted to be rendered active when the said reciprocating element is moved in the opposite direction, each of the said co-operating means being rendered inactive when the other is active, the said shaft having a constant direction of rotation.

4. A shaft, a clutch element revolving with the shaft, a spiral loosely mounted upon the shaft, said spiral being formed of a piece of wire like material bent into shape, one end of the spiral being bent to form a tooth, a clutch element connected with the spiral, a reciprocating element engaging with the spiral and operating when moved in one direction to move the spiral lengthwise of the shaft to bring the said tooth into co-operative relation with the said clutch element to rotate the shaft, the said tooth and clutch element being rendered inactive with respect to each other when the said reciprocating element is being moved in the opposite direction and the shaft is not being driven by the spiral.

5. A shaft, a plurality of clutch elements revolving with the shaft, said elements being separate and independent of each other, a plurality of separate spirals loosely mounted upon the shaft, one of the spirals encompassing the other, a clutch element connected with each of the spirals, each of the last recited clutch elements being adapted to co-operate with one of the first recited clutch elements, a reciprocating element engaging with both of the spirals and adapted upon its movement in each direction to move one of the spirals lengthwise of the shaft to bring the clutch element of the respective spiral into co-operative relation with the respective clutch element carried by the shaft to rotate the shaft, the active clutch elements being rendered inactive when the shaft is not being driven by the respective spiral, the said shaft having a constant direction of rotation.

6. A rotatable element, a reciprocating element, and means whereby the movement of the reciprocating element will actuate the rotatable element, the said means embodying a spiral loosely sleeved upon the rotatable element and engaged by the reciprocating element, said spiral being formed of a piece of wire like material, one end of which is shaped to form a tooth, and a clutch portion on the said rotatable element, said spiral being shiftable in a direction lengthwise of its axis by the reciprocating member to move the tooth into co-operative relation with the clutch portion on the shaft, and then rotated by said member to drive the shaft, the said tooth and clutch portion being rendered inactive when the shaft is not being driven by the spiral.

In testimony whereof we have signed our names to this specification, on this 14th day of January, A. D. 1922.

GUSTAF E. KRANTZ.
CARL A. KRANTZ.